United States Patent
Harai et al.

(10) Patent No.: US 12,548,683 B2
(45) Date of Patent: Feb. 10, 2026

(54) NUCLEAR REACTOR UNIT AND METHOD FOR COOLING NUCLEAR REACTOR UNIT

(71) Applicant: MITSUBISHI HEAVY INDUSTRIES, LTD., Tokyo (JP)

(72) Inventors: Yasutaka Harai, Tokyo (JP); Satoru Kamohara, Tokyo (JP); Tadakatsu Yodo, Tokyo (JP); Shota Kobayashi, Tokyo (JP); Shohei Otsuki, Tokyo (JP); Nozomu Murakami, Tokyo (JP); Wataru Nakazato, Tokyo (JP); Takashi Hasegawa, Tokyo (JP); Yutaka Tanaka, Tokyo (JP); Tatsuo Ishiguro, Tokyo (JP); Hironori Noguchi, Tokyo (JP); Hideyuki Kudo, Tokyo (JP); Takafumi Noda, Tokyo (JP); Kazuhiro Yoshida, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 354 days.

(21) Appl. No.: 18/028,591

(22) PCT Filed: Sep. 21, 2021

(86) PCT No.: PCT/JP2021/034623
§ 371 (c)(1),
(2) Date: Mar. 27, 2023

(87) PCT Pub. No.: WO2022/075058
PCT Pub. Date: Apr. 14, 2022

(65) Prior Publication Data
US 2023/0360812 A1    Nov. 9, 2023

(30) Foreign Application Priority Data
Oct. 9, 2020    (JP) .................................. 2020-171289

(51) Int. Cl.
*G21C 13/02*     (2006.01)
*G21C 15/18*     (2006.01)
*G21C 5/02*      (2006.01)

(52) U.S. Cl.
CPC .......... *G21C 13/022* (2013.01); *G21C 15/18* (2013.01); *G21C 5/02* (2013.01)

(58) Field of Classification Search
CPC .... G21C 9/008; G21C 13/022; G21C 13/028; G21C 13/0285; G21C 13/10; G21C 15/257; G21C 15/02; G21C 15/04; G21C 15/08
See application file for complete search history.

(56) References Cited

U.S. PATENT DOCUMENTS

| | | |
|---|---|---|
| 5,703,917 A | 12/1997 | Hau et al. |
| 2009/0067565 A1* | 3/2009 | Eckardt ................. F16K 17/386 376/283 |

(Continued)

FOREIGN PATENT DOCUMENTS

| | | | | |
|---|---|---|---|---|
| DE | 4426856 C1 * | 7/1995 | ........... | F16K 17/383 |
| JP | H04-034396 A | 2/1992 | | |

(Continued)

OTHER PUBLICATIONS

International Search Report dated Dec. 7, 2021, issued in counterpart International application No. PCT/JP2021/034623, with English translation. (17 pages).

*Primary Examiner* — Sharon M Davis
(74) *Attorney, Agent, or Firm* — WHDA, LLP (57) ABSTRACT

Provided is a nuclear reactor unit that can reduce a temperature increase in a reactor core at the occurrence of an abnormality with a simple structure. Included are a reactor core having radioactive fuel and causing the radioactive fuel to cause a nuclear reaction and a nuclear reactor vessel housing the reactor core and hermetically sealing the reactor (Continued)

core. The nuclear reactor vessel includes an inner shroud covering the entire periphery of the reactor core and an outer shroud covering the entire periphery of the inner shroud. A first space formed by the outer shroud and the inner shroud is in a vacuum condition. The inner shroud includes a main body and a communicating part placed in part of the main body and communicating the first space to a second space, which is a space inside the inner shroud, when the reactor core reaches a threshold temperature or higher.

9 Claims, 6 Drawing Sheets

(56) References Cited

U.S. PATENT DOCUMENTS

| | | |
|---|---|---|
| 2009/0129531 A1 | 5/2009 | Reyes, Jr. et al. |
| 2020/0194134 A1 | 6/2020 | Shearer et al. |

FOREIGN PATENT DOCUMENTS

| | | |
|---|---|---|
| JP | H08-511103 A | 11/1996 |
| JP | 2011-503614 A | 1/2011 |
| JP | 2013-076675 A | 4/2013 |
| JP | 2016-223865 A | 12/2016 |
| JP | 2020-98599 A | 6/2020 |

* cited by examiner

NUCLEAR REACTOR UNIT AND METHOD FOR COOLING NUCLEAR REACTOR UNIT

FIELD

The present disclosure relates to a nuclear reactor unit and a method for cooling a nuclear reactor unit.

BACKGROUND

A nuclear reactor unit, which causes a nuclear reaction with a radioactive substance to take out heat energy, controls the reaction and the like to control the temperature of a reactor core and to adjust heat energy to be generated. The nuclear reactor unit, when reaching a temperature higher than a set temperature during operation, or an abnormal temperature by which it can be determined that an abnormality is occurring, cools the reactor core. In Patent Literature 1, for example, a thermoelectric conversion element is attached to an outer wall of a heat insulating part to cool an outer face with air. In Patent Literature 2, an endothermic component immersed in a coolant is thermally coupled to a heat sink when power is lost.

CITATION LIST

Patent Literature

Patent Literature 1: Japanese Patent Application Laid-open No. H04-34396
Patent Literature 2: Japanese Patent Application Laid-open No. 2013-76675

SUMMARY

Technical Problem

In the nuclear reactor unit, a nuclear reactor vessel housing the reactor core may have a heat insulating structure. In this case, even when the outside of the nuclear reactor vessel or the outer surface of the nuclear reactor vessel is cooled as in Patent Literature 1 and Patent Literature 2, cooling is not promoted. In a mechanism detecting a case in which the temperature of the reactor core becomes a temperature at which an abnormality is occurring to perform control and to start cooling, if the control does not function depending on the cause of the abnormality, loads more than necessary are exerted on the nuclear reactor unit, which may make the problem serious.

In order to solve the above problem, an object of the present disclosure is to provide a nuclear reactor unit that can reduce a temperature increase in the reactor core at the time of occurrence of an abnormality with a simple structure and a method for cooling a nuclear reactor unit.

Solution to Problem

A nuclear reactor unit according to the present disclosure includes: a reactor core that has radioactive fuel and causes the radioactive fuel to cause a nuclear reaction; and a nuclear reactor vessel that houses the reactor core and hermetically seals the reactor core. The nuclear reactor vessel includes an inner shroud that covers the entire periphery of the reactor core and an outer shroud that covers the entire periphery of the inner shroud. A first space formed by the outer shroud and the inner shroud is in a vacuum condition. The inner shroud includes a main body and a communicating part that is placed in part of the main body, the communicating part communicating the first space to a second space that is a space inside the inner shroud, when the reactor core reaches a threshold temperature or higher.

A method according to the present disclosure is for cooling a nuclear reactor unit. The nuclear reactor unit includes a reactor core that has radioactive fuel and causes the radioactive fuel to cause a nuclear reaction and a nuclear reactor vessel that houses the reactor core and hermetically seals the reactor core. The nuclear reactor vessel includes an inner shroud that covers the entire periphery of the reactor core and an outer shroud that covers the entire periphery of the inner shroud. A first space formed by the outer shroud and the inner shroud is in a vacuum condition. The inner shroud includes a main body and a communicating part that is placed in part of the main body. The method includes causing the communicating part to break the vacuum condition of the first space by communicating the first space to a second space that is a space inside the inner shroud, when the reactor core reaches a threshold temperature or higher.

Advantageous Effects of Invention

The present disclosure can reduce a temperature increase in the reactor core at the time of occurrence of an abnormality with a simple structure.

DESCRIPTION OF EMBODIMENTS

The following describes an embodiment according to the present disclosure in detail based on the accompanying drawings. This invention is not limited by this embodiment. The components in the following embodiment include a constituent element that is replaceable by those skilled in the art and is easy, or substantially the same constituent element. Furthermore, the components described below can be combined with each other as appropriate, and if there are a plurality of embodiments, the embodiments can be combined with each other.

<Nuclear Power Generation System>

Figure 1:
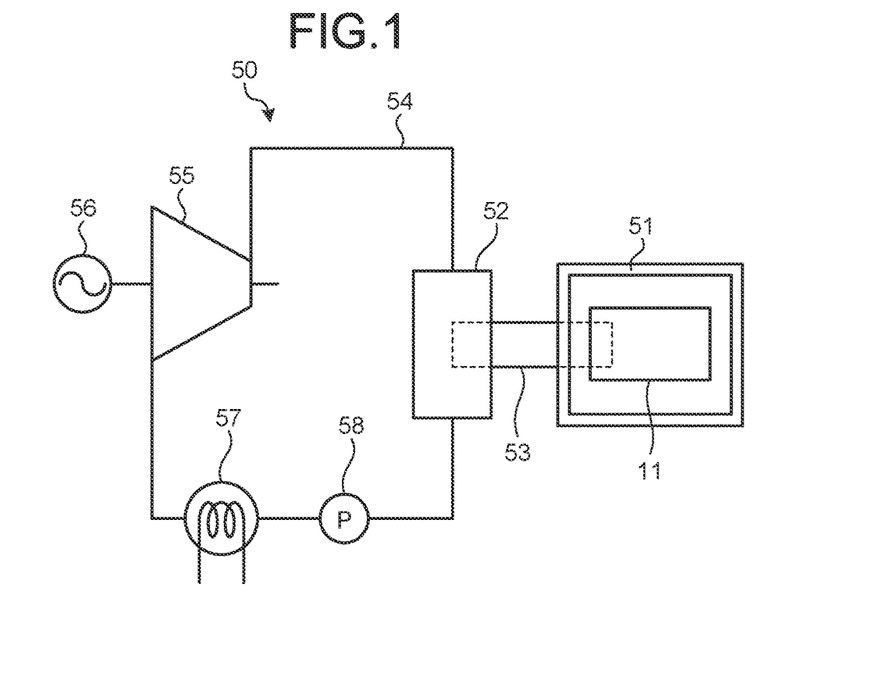
FIG. 1 is a schematic diagram of a nuclear power generation system as an example of a nuclear reactor unit according to the present embodiment.

FIG. 1 is a schematic diagram of a nuclear power generation system as an example of a nuclear reactor unit according to the present embodiment. As illustrated in FIG. 1, this nuclear power generation system 50 has a nuclear reactor vessel 51, a heat exchanger 52, a heat conductive part 53, a coolant circulating unit 54, a turbine 55, a power generator 56, a cooler 57, and a compressor 58.

The nuclear reactor vessel (a housing vessel) 51 houses a nuclear reactor 11 thereinside. The nuclear reactor vessel 51 houses the nuclear reactor 11 in a hermetically sealed condition. The nuclear reactor vessel 51 is provided with an opening and closing part such as a lid so that the nuclear reactor 11 placed thereinside can be housed or taken out. The nuclear reactor vessel 51 can maintain its hermetically sealed condition even when a nuclear reaction occurs in the nuclear reactor 11 to make the inside high temperature and high pressure. The nuclear reactor vessel 51 is formed of a material having neutron beam blocking performance, such as concrete or metal, and is formed thick enough to prevent neutron rays generated inside from leaking to the outside. The nuclear reactor vessel 51 may contain elements with high blocking performance such as boron in the material. The structure of the nuclear reactor vessel 51 is described below.

The heat exchanger 52 performs heat exchange with the nuclear reactor 11. The heat exchanger 52 of the present embodiment recovers the heat of the nuclear reactor 11 via a solid, highly heat conductive material of the heat conductive part 53 partially placed inside the nuclear reactor vessel 51. The heat conductive part 53 illustrated in FIG. 1 schematically illustrates heat conductive parts 3, which are described below.

The coolant circulating unit 54 is a path through which a coolant is circulated, in which the heat exchanger 52, the turbine 55, the cooler 57, and the compressor 58 are connected to each other. The coolant flowing through the coolant circulating unit 54 flows through the heat exchanger 52, the turbine 55, the cooler 57, and the compressor 58 in this order, and the coolant having passed through the compressor 58 is supplied to the heat exchanger 52. Consequently, the heat exchanger 52 performs heat exchange between the solid, highly heat conductive material of the heat conductive part 53 and the coolant flowing through the coolant circulating unit 54.

The coolant having passed through the heat exchanger 52 flows into the turbine 55. The turbine 55 is rotated by the energy of the heated coolant. In other words, the turbine 55 converts the energy of the coolant into rotational energy to absorb the energy from the coolant.

The power generator 56 is coupled to the turbine 55 and rotates integrally with the turbine 55. The power generator 56 rotates with the turbine 55 to perform power generation.

The cooler 57 cools the coolant having passed through the turbine 55. The cooler 57 is a chiller or a condenser or the like when the coolant is temporarily liquefied.

The compressor 58 is a pump pressurizing the coolant.

The nuclear power generation system 50 conducts heat generated through the reaction of nuclear fuel of the nuclear reactor 11 to the heat exchanger 52 by the heat conductive part 53. The nuclear power generation system 50 heats the coolant flowing through the coolant circulating unit 54 by the heat of the highly heat conductive material of the heat conductive part 53 in the heat exchanger 52. In other words, the coolant absorbs heat in the heat exchanger 52. The heat generated in the nuclear reactor 11 is thereby recovered by the coolant. The coolant is compressed by the compressor 58 and is then heated when passing through the heat exchanger 52 to rotate the turbine 55 by compressed and heated energy. The coolant is then cooled to a standard state by the cooler 57 and is again supplied to the compressor 58. The heat exchanger 52, the coolant circulating unit 54, the turbine 55, the power generator 56, and the compressor 58 can be replaced with thermoelectric elements or the like to be used for hydrogen production using power generation or heat.

As described above, the nuclear power generation system 50 conducts the heat of the nuclear reactor 11 to the coolant as a medium rotating the turbine 55 via the heat conductive part 53 formed of the highly heat conductive material. The nuclear reactor 11 and the coolant as the medium rotating the turbine 55 can be thereby isolated from each other, and the risk of the medium rotating the turbine 55 being polluted can be reduced.

Figure 2:
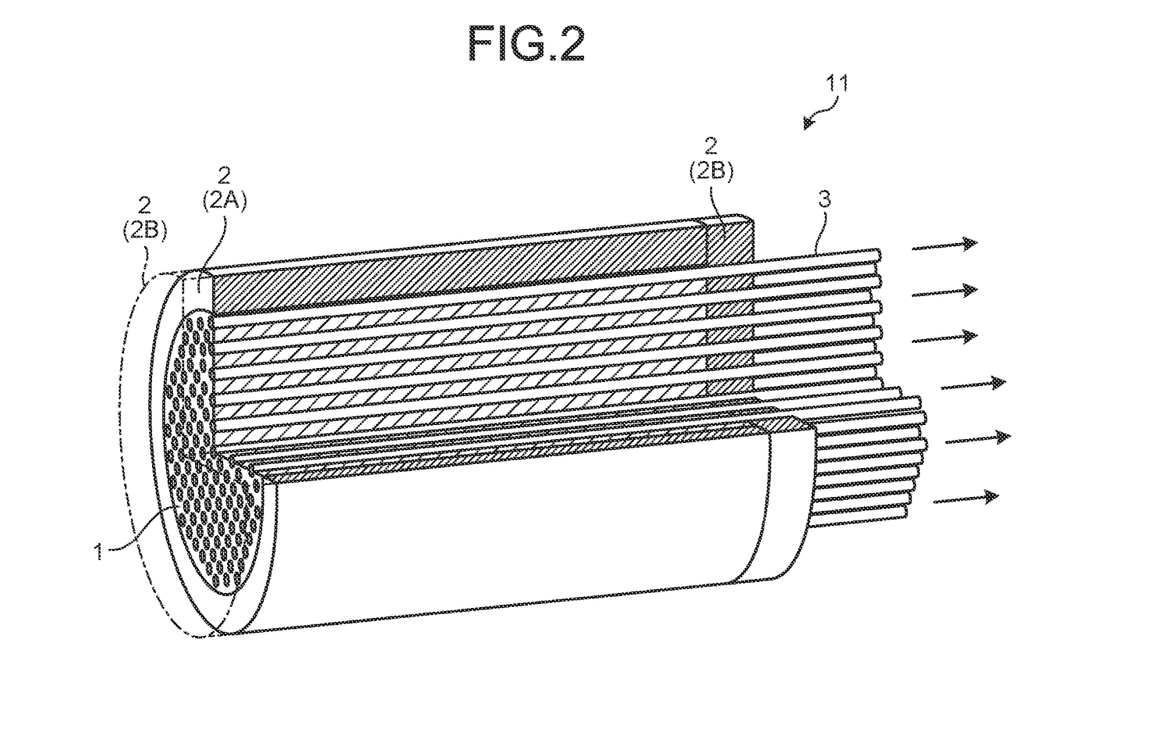
FIG. 2 is a schematic diagram of a nuclear reactor according to the present embodiment.
Figure 3:
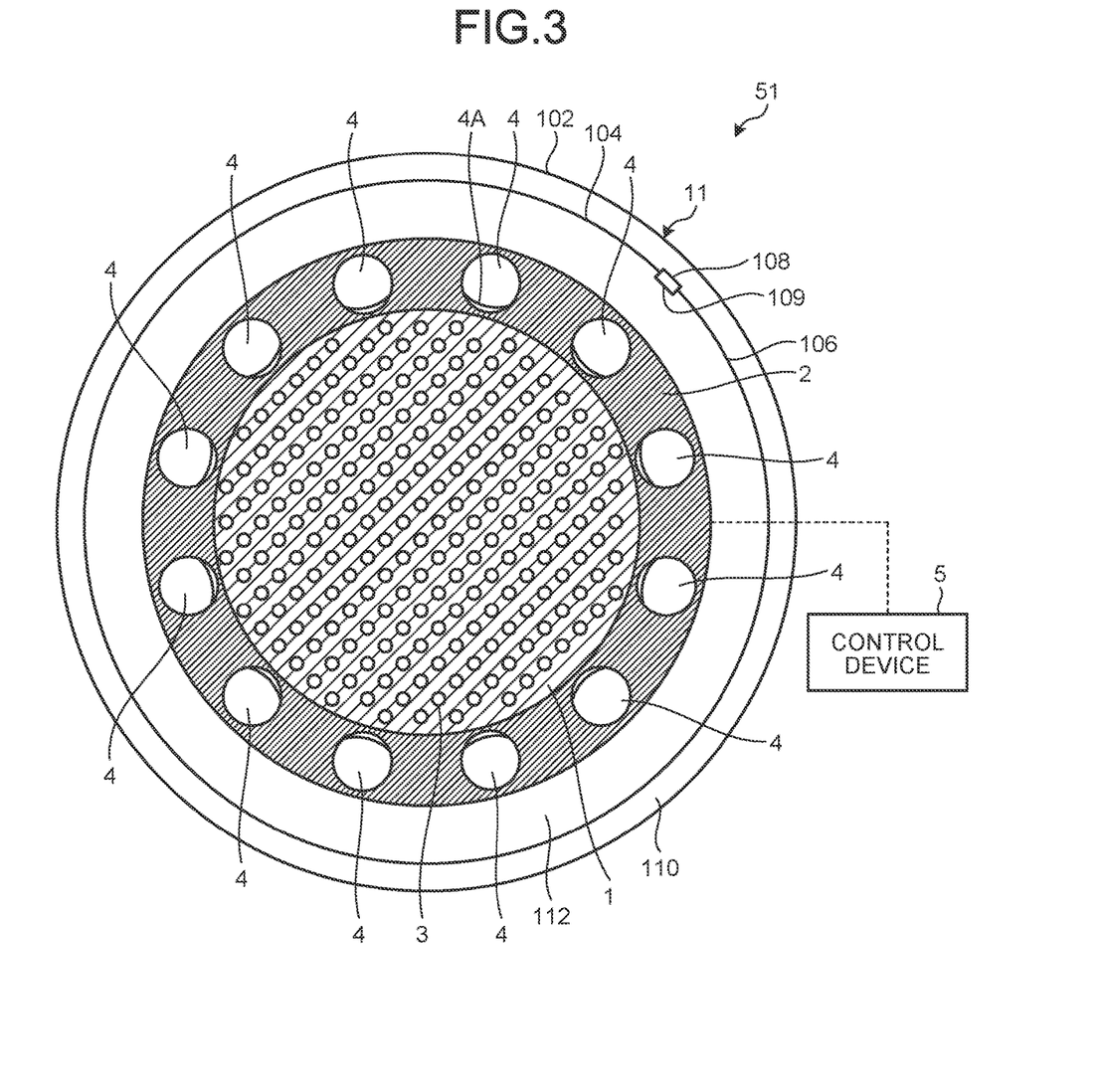
FIG. 3 is a sectional schematic diagram of the nuclear reactor and a nuclear reactor vessel according to the present embodiment.
Figure 4:
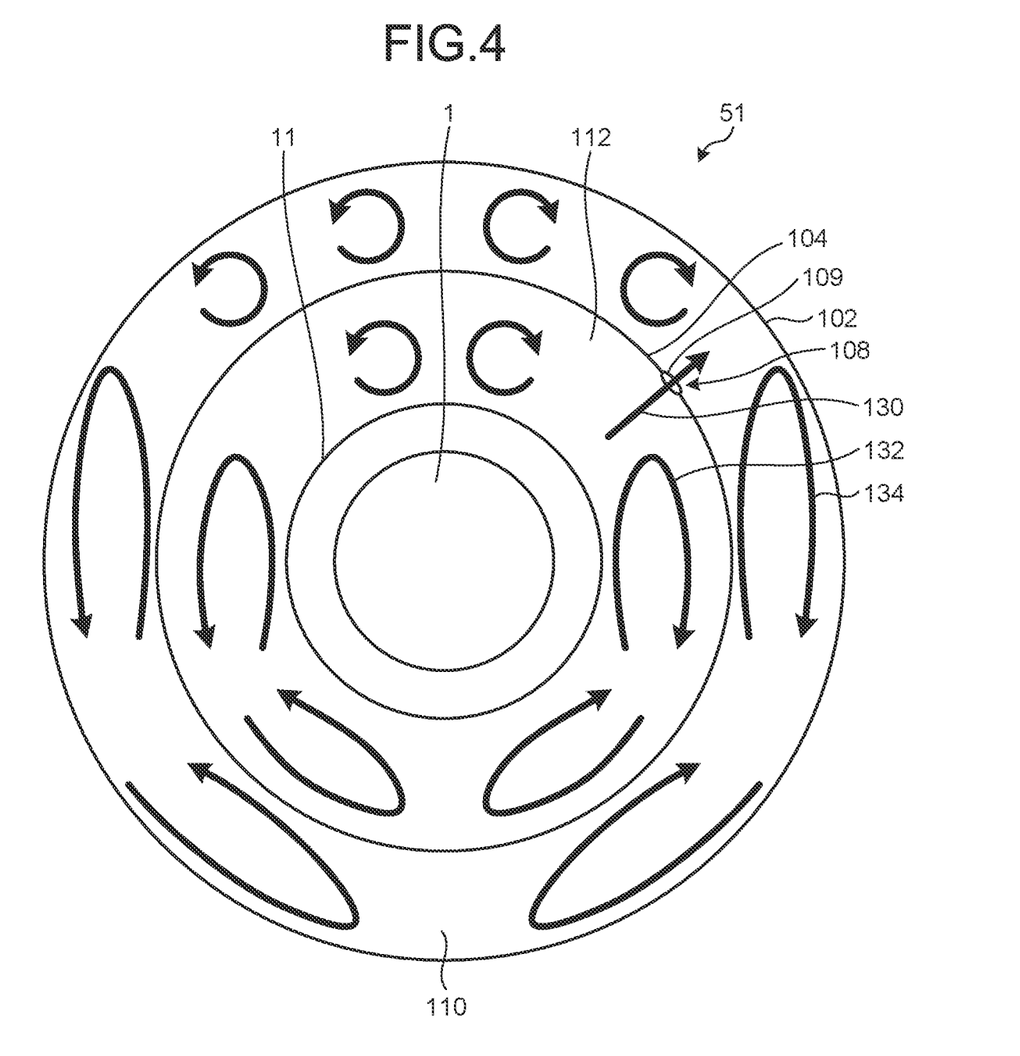
FIG. 4 is a sectional schematic diagram illustrating the function of the nuclear reactor unit according to the present embodiment.

FIG. 2 is a schematic diagram of the nuclear reactor 11 according to the embodiment. FIG. 3 is a sectional schematic diagram of the nuclear reactor and a nuclear reactor vessel according to the present embodiment. FIG. 4 is a sectional schematic diagram for illustrating the function of the nuclear reactor unit according to the present embodiment.

As illustrated in FIG. 2 and FIG. 3, the nuclear reactor 11 includes a reactor core (a fuel part) 1, a shielding part 2, and the heat conductive parts 3, and control parts 4.

The reactor core 1 has nuclear fuel and supports the nuclear fuel. The reactor core 1 is provided with control rods, which are not illustrated, controlling the nuclear reaction of the nuclear fuel in an insertable and extractable manner. The reactor core 1 inhibits the nuclear reaction of the nuclear fuel by the control rods being inserted. The reactor core 1 causes the nuclear reaction of the nuclear fuel by the control rods being extracted.

The reactor core 1 is formed in a columnar shape as a whole. In the present embodiment, the reactor core 1 is formed in a substantially cylindrical shape. The direction in which this columnar shape extends may be referred to as an axial direction. The direction orthogonal to the axial direction may be referred to as a radial direction. The reactor core 1 includes nuclear fuel (a radioactive material) and a support. The support is formed extending in the axial direction. The support is placed throughout the entire area of the reactor core 1 in the axial direction. Insertion holes through which the rod-shaped heat conductive parts 3 are inserted in the axial direction pass through the support in the axial direction. In the embodiment, the insertion holes are formed in a circular shape in cross section. The support is formed with holes, in which the nuclear fuels are placed, around the insertion holes passing through in the axial direction. The holes are formed in a circular shape, for example. The support may contain a moderator. As the moderator, graphene, graphite, or the like can be used, for example. The nuclear fuels are placed in the holes in the support. The nuclear fuel has a circular shape corresponding to the shape of each hole in the support. The nuclear fuel is formed in a rod shape continuous in the axial direction. The rod-shaped nuclear fuel may be filled with pellet-shaped nuclear fuel inside the tube circular in cross section. For the nuclear fuel, uranium (uranium 235, for example), plutonium (plutonium 239 or 241, for example), or thorium can be used as a fissile material.

The shielding part 2 covers the periphery of the fuel part 1. The shielding part 2 includes a metallic block and reflects radiation (neutrons) applied from the nuclear fuel to prevent the radiation from being leaked to the outside covering the fuel part 1. The shielding part 2 may be called a reflector in accordance with the ability of neutron scattering and neutron absorption of the used material.

The shielding part 2 in the present embodiment includes a body 2A formed in a tubular shape so as to cover the entire periphery of the columnar shape on the fuel part 1 and respective lids 2B covering both ends of the body 2A. In housing the fuel part 1 inside, the inside of the shielding part 2 with the hermetically sealed structure is preferably filled with an inert gas such as a nitrogen gas for the purpose of preventing oxidation inside.

The heat conductive parts 3 pass through the shielding part 2 and are inserted into the fuel part 1 provided inside covered by the shielding part 2 to be placed extending inside the fuel part 1 and outside the shielding part 2. The heat conductive parts 3 conduct the heat generated by the nuclear reaction of the nuclear fuel of the fuel part 1 to the outside of the shielding part 2 by solid heat conduction. For the heat conductive parts 3, titanium, nickel, copper, or graphite can be used, for example. For graphite, graphene in particular can be used. Graphene has a structure in which hexagonal lattices including carbon atoms and their bonding continue, and the direction in which the hexagonal lattices continue is set to a heat conduction direction, whereby heat conduction efficiency can be improved. The part of the heat conductive parts 3 extending outside the shielding part 2 is provided so as to be able to perform heat exchange with the coolant outside the nuclear reactor vessel 51.

The heat conductive parts 3 are formed in a rod shape extending in the axial direction. In the present embodiment, the heat conductive parts 3 are formed in a rod shape circular in cross section. The heat conductive parts 3 are inserted into the insertion holes formed in the support in the fuel part 1 and are placed passing through one of the lids in the shielding part 2 and extending outside the shielding part 2.

The control parts 4 are supported by the shielding part 2. A plurality of (12 in the present embodiment) control parts 4 are provided surrounding the columnar shape of the fuel part 1. The control parts 4 are placed evenly surrounding the columnar shape of the fuel part 1. The control parts 4 are cylindrical, are formed in what is called a drum shape, and are formed extending in the axial direction, which is the extension direction of the columnar shape of the fuel part 1. The control parts 4 are provided so as to be rotatable about the center of the cylindrical shape. The control parts 4 are each provided with a neutron absorber 4A in part of the periphery of the cylindrical shape. For the neutron absorber 4A, boron carbide ($B_4C$) can be used, for example. The neutron absorber 4A is provided such that it can rotate and move with the rotation of the control parts 4 and move closer to or away from the fuel part 1 as the reactor core. When the neutron absorber 4A moves closer to the fuel part 1, the reactivity of the fuel part 1 decreases, whereas when the neutron absorber 4A moves away from the fuel part 1, the reactivity of the fuel part 1 increases. Thus, the control parts 4 cause the neutron absorber 4A to move close to or away from the fuel part 1 and can thereby control the reactivity of the fuel part 1 as the reactor core and control the reactor core temperature of the fuel part 1. The reactor core temperature is an average reactor core temperature taken out of the shielding part 2 by the heat conductive parts 3.

The control parts 4 are controlled for rotational movement by a control device 5. The control device 5 is a computer, for example, and is implemented by an arithmetic processing unit including a microprocessor such as a central processing unit (CPU), although not explicitly illustrated in the drawing. The control device 5 can obtain the reactor core temperature of the fuel part 1. The control device 5 controls the rotational position of the control parts 4 to cause the neutron absorber 4A to move away from the fuel part 1. Consequently, the reactivity of the fuel part 1 as the reactor core increases, and the nuclear reactor 11 starts operation. The control device 5 controls the rotational position of the control parts 4 to cause the neutron absorber 4A to move closer to the fuel part 1. Consequently, the reactivity of the fuel part 1 as the reactor core decreases, and the nuclear reactor 11 stops operation.

Consequently, the nuclear reactor 11 of the present embodiment can take the heat generated by the nuclear reaction of the nuclear fuel of the fuel part 1 out of the shielding part 2 by solid heat conduction by the heat conductive parts 3. The heat having been taken out of the shielding part 2 is then conducted to the coolant, which rotates the turbine 55.

The nuclear reactor 11 of the present embodiment can take the heat of the nuclear fuel of the fuel part 1 out of the shielding part 2 by solid heat conduction by the heat conductive parts 3 and conduct the heat to the coolant. The nuclear reactor 11 of the present embodiment can prevent leakage of radioactive materials or the like. In the nuclear reactor 11 of the present embodiment, the heat conductive parts 3 are placed extending inside the fuel part 1 and outside the shielding part 2 and can thus take the heat of the nuclear fuel of the fuel part 1 out of the shielding part 2 while reducing the conduction distance of the heat compared to a case in which the heat conductive parts 3 are not inside. The nuclear reactor 11 of the present embodiment can ensure high output temperature. Although the nuclear reactor 11 of the present embodiment describes the heat conductive parts 3 in the form of taking out the heat by solid heat conduction, other heat conductive parts in the form of taking out the heat by fluid heat conduction using a liquid-encapsulated heat pipe may be used, for example.

The nuclear reactor 11 of the present embodiment described above has a weight density of the fissile materials of the nuclear fuel of 5 wt % or more during an operation period. The nuclear reactor 11 of the present embodiment preferably has a weight density of the fissile materials of the nuclear fuel of 15 wt % or more. The nuclear reactor 11 of the present embodiment more preferably has a weight density of the fissile materials of the nuclear fuel of 15 wt % or more and 20 wt % or less. The nuclear reactor 11 of the present embodiment has a reactor core temperature (an average reactor core temperature) of 350° C. or higher during the operation period. The nuclear reactor 11 of the present embodiment preferably has a reactor core temperature of 500° C. or higher and 1,500° C. or lower. The nuclear reactor 11 of the present embodiment more preferably has a reactor core temperature of 750° C. or higher and 1,500° C. or lower. The thermal output per volume of the nuclear fuel and the operation period are designed to keep the decrease of the fissile materials associated with operation to ⅓ or less of the level at the start of operation. In the nuclear reactor 11 of the present embodiment, the thermal output per volume of the nuclear fuel and the operation period are preferably designed to keep the decrease of the fissile materials associated with operation to ⅕ or less of the level at the start of operation. In the nuclear reactor 11 of the present embodiment, the thermal output per volume of the nuclear fuel and the operation period are more preferably designed to keep the decrease of the fissile materials associated with operation to 1/10 or less of the level at the start of operation.

The following describes the configuration of the nuclear reactor vessel 51. As described above, the nuclear reactor vessel 51 covers the periphery of the reactor core 1 to hermetically seal the reactor core 1. The nuclear reactor vessel 51 is passed through by the heat conductive parts 3. The part of the nuclear reactor vessel 51 in contact with the heat conductive parts 3 is also a hermetically sealed structure. The nuclear reactor vessel 51 may partially have a lid to be an openable and closable structure.

As illustrated in FIG. 3, the nuclear reactor vessel 51 includes an outer shroud 102 and an inner shroud 104. The nuclear reactor vessel 51 may be provided with a vessel covering the periphery of the outer shroud 102 outside the outer shroud 102. The outer shroud 102 is a vessel covering the entire periphery of the reactor core 1 (the nuclear reactor 11). The inner shroud 104 is a vessel placed between the outer shroud 102 and the reactor core 1 and covering the entire periphery of the reactor core 1. The nuclear reactor vessel 51 is a double vessel covering the outside of the reactor core 1 by the inner shroud 104 and the outer shroud 102. The space surrounded by the inner shroud 104 and the outer shroud 102 is a first space 110. The space surrounded by the inner shroud 104, that is, the space in which the reactor core 1 is placed and hermetically sealed by the inner shroud 104 is a second space 112. The first space 110 and the second space 112 are in a state in which air (fluid) does not pass therebetween by the inner shroud 104. The first space 110 is in a vacuum condition. The vacuum condition of the present embodiment is a condition with a degree of vacuum of $10^{-2}$ Pa or less. The second space 112 is a space with a lower degree of vacuum than that of the first space 110 and has a pressure of 0.1 MPa or more and 0.4 MPa or less, for example. The second space 112 is a space in which the reactor core 1 is placed and is thus preferably filled with an inert gas such as nitrogen.

The outer shroud 102 and the inner shroud 104 are each a tubular vessel and can be formed of concrete or metal, for example. The inner shroud 104 includes a main body 106 and a communicating part 108. The main body 106 is a vessel forming the first space 110 that is hermetically sealed. The main body 106 is formed of metal that can maintain its shape even when reaching a temperature higher than a normal temperature during the operation of the reactor core 1, that is, when the reactor core 1 becomes an abnormal operating state and reaches a threshold temperature, in other words, formed of a material with a melting temperature higher than the threshold temperature. For the main body 106, stainless steel can be used as the metal, for example. The main body 106 is formed of metal with a melting point of 1,000° C. or higher, for example. The main body 106 is formed of a material with a melting point of A+100° C. or higher when the temperature during the rated operation of the reactor core 11 is A° C. The main body 106 is formed with a hole 109 in part of it. The hole 109 is a through hole connecting the first space 110 and the second space 112 to each other. The shape of the hole 109 is not limited to a particular shape and can be any of various shapes such as circular, rectangular, and polygonal shapes.

The communicating part 108 plugs the hole 109. The communicating part 108 of the present embodiment is a filling part. The communicating part 108 is formed of a material that can keep the hole 109 sealed in the case of the normal temperature during the operation of the reactor core 1 and is detached from the hole 109 when the threshold temperature is reached. The communicating part 108 is formed of metal melting when the reactor core 1 reaches the threshold temperature and the temperature of the second space 112 becomes higher than a certain temperature, for example. For the communicating part 108, brass can be used as the metal, for example. The communicating part 108 is formed of metal with a melting point of 850° C. or higher, for example. The communicating part 108 is formed of a material with a melting point of A° C. or higher when the temperature during the rated operation of the reactor core 11 is A° C.

FIG. 4 is a sectional schematic diagram for illustrating the function of the nuclear reactor unit according to the present embodiment. In the nuclear power generation system (the nuclear reactor unit) 50, the nuclear reactor vessel 51 has a double vessel structure and the first space 110 has a vacuum condition, so as to be able to prevent heat from being emitted from the part of the second space 112 other than the heat conductive parts 3. With this effect, the heat generated in the reactor core 1 can be conducted to the heat conductive parts 3 with high efficiency and reduce the occurrence of loss.

In the nuclear power generation system 50, when the temperature of the reactor core 1 becomes higher than the threshold temperature, the temperature of the second space 112 increases by the heat of the reactor core 1. In the nuclear reactor vessel 51, when the temperature of the second space 112 becomes higher than the certain temperature, the communicating part 108 is detached from the hole 109, and the second space 112 gets to communicate with the first space 110 as illustrated in FIG. 4. With this state, fluid (gas) flows into the first space 110 from the second space 112 as indicated in a flow 130, and the first space 110 becomes a state in which a certain amount or more of gas is present from the vacuum condition.

In the second space 112, gas circulates by flows 132 in the same manner as in the state sealed by the communicating part 108. In the first space 110, the gas having flowed thereinto caused by the detachment of the communicating part 108 and the communication with the second space 112 through the hole 109 circulates by flows 134. The nuclear reactor vessel 51 breaks the vacuum of the first space 110 to become a state in which the inside of the first space 110 is filled with gas conducting heat. With this effect, the heat of the reactor core 1 is conducted to the inner shroud 104 by the flows 132 of the second space 112. The heat of the inner shroud 104 is conducted to the outer shroud 102 by the flows 134 of the first space 110. The outer shroud 102 discharges the heat to the outside of the nuclear reactor vessel 51. The communicating part 108 is not limited to melting and becoming deformed by temperature to be detached from the hole 109 or form a hole in the communicating part 108. The communicating part 108 may be heated at a certain temperature to reduce its strength, become deformed, and be detached from the hole 109 by pressure generated by the differential pressure between the first space 110 and the second space 112.

According to the above, the nuclear power generation system 50 causes the first space of the nuclear reactor vessel 51 to be vacuum to prevent heat radiation during the normal operation, and when the temperature of the reactor core 11 abnormally increases, causes a state in which the communicating part 108 is detached from the hole 109 by the influence of the temperature condition, to break the vacuum, thereby discharging the heat of the reactor core 11 to the outside. The nuclear power generation system 50 has the mechanism in which the communicating part 108 breaks the vacuum by the temperature increase occurring when becoming an abnormal operating condition and can thereby automatically increase the heat radiation performance of the nuclear reactor vessel 51 without operating another part or causing an operator or the like to input operation based on a temperature detection result. With this effect, the safety of the nuclear power generation system 50 can be more increased.

Figure 5:
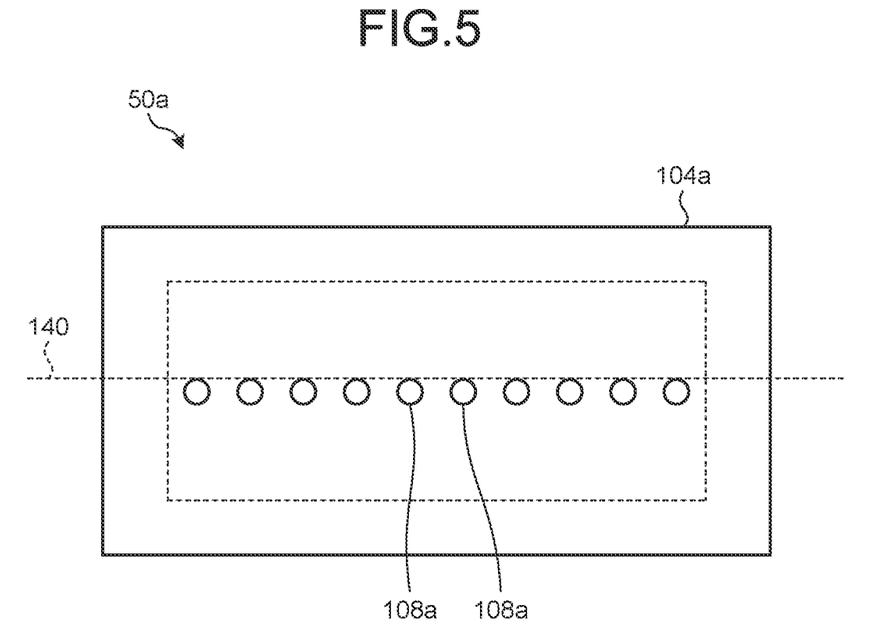
FIG. 5 is a side view of an inner shroud of a nuclear reactor unit of another embodiment.

FIG. 5 is a side view of an inner shroud of a nuclear reactor unit of another embodiment. Although in the above embodiment the communicating part 108 is provided at one location of the inner shroud 104, this is not limiting. This inner shroud 104*a* of this nuclear power generation system 50*a* illustrated in FIG. 5 is provided with a plurality of communicating parts 108*a*. The communicating parts 108*a* are placed at certain intervals along an axial direction 140 of the columnar shape of the reactor core. The communicating parts 108*a* are filling parts filling holes formed in the main body 106. The communicating parts 108*a* are the same shape as that of the communicating part 108.

The nuclear power generation system 50*a* is provided with the communicating parts 108*a* in the axial direction in the inner shroud 104*a* and thereby, even when only part in the temperature distribution of the reactor core 11 in the axial direction reaches the threshold temperature, the communicating parts 108*a* corresponding to the part that has reached the threshold temperature or higher can break the vacuum of the first space. With this effect, even when part of the reactor core 11 becomes an abnormal state, cooling performance can be increased, enabling safer operation.

The nuclear power generation system 50*a*, which is provided with the communicating parts in the axial direction of the reactor core 11, may be provided with a plurality of communicating parts in the circumferential direction of the reactor core 11. When there is a tendency in the temperature distribution of the reactor core 11, the placement density of the communicating parts may be adjusted in accordance with the purpose.

Figure 6:
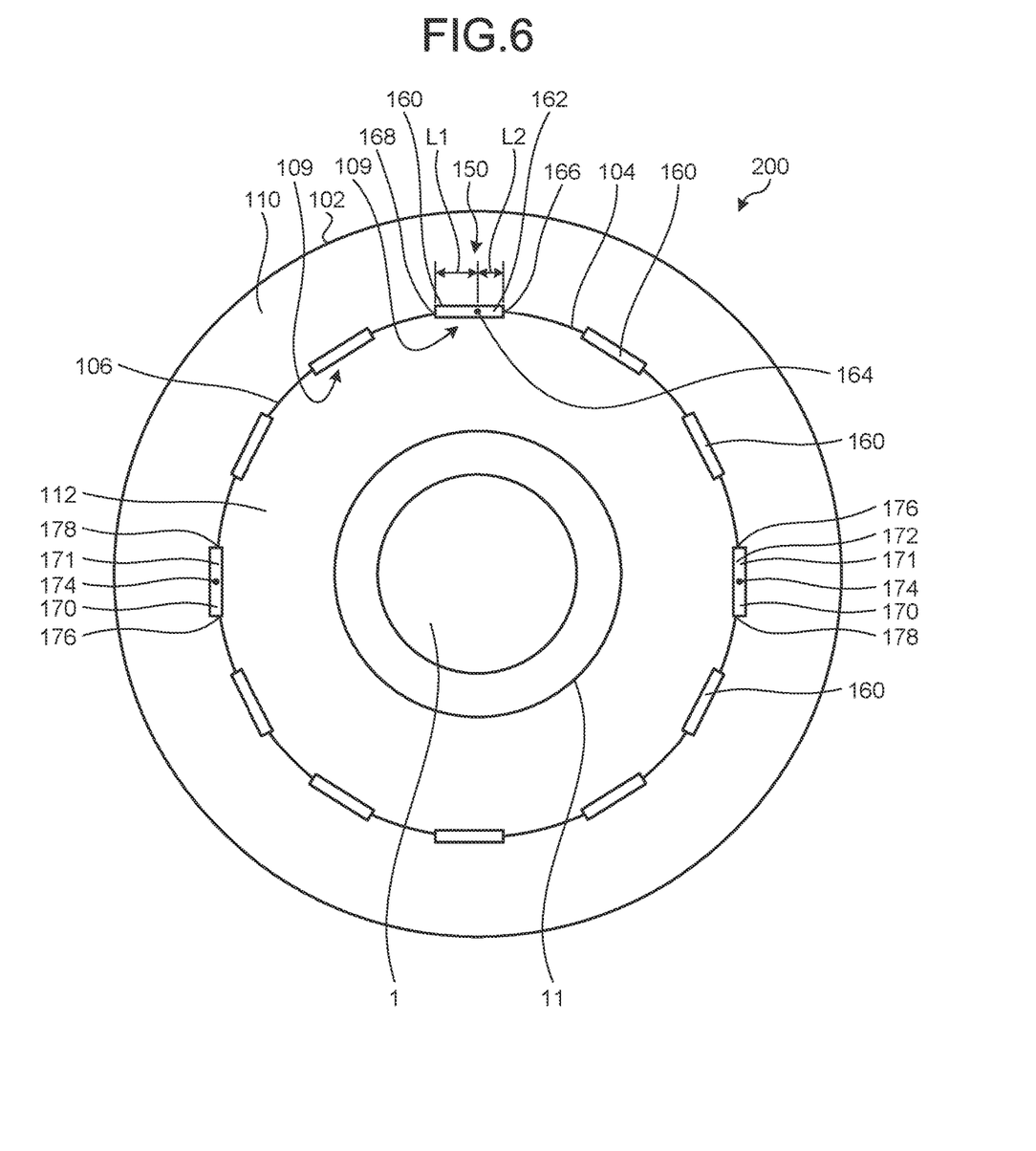
FIG. 6 is a sectional schematic diagram of a nuclear reactor and a nuclear reactor vessel of a nuclear reactor unit of another embodiment.
Figure 7:
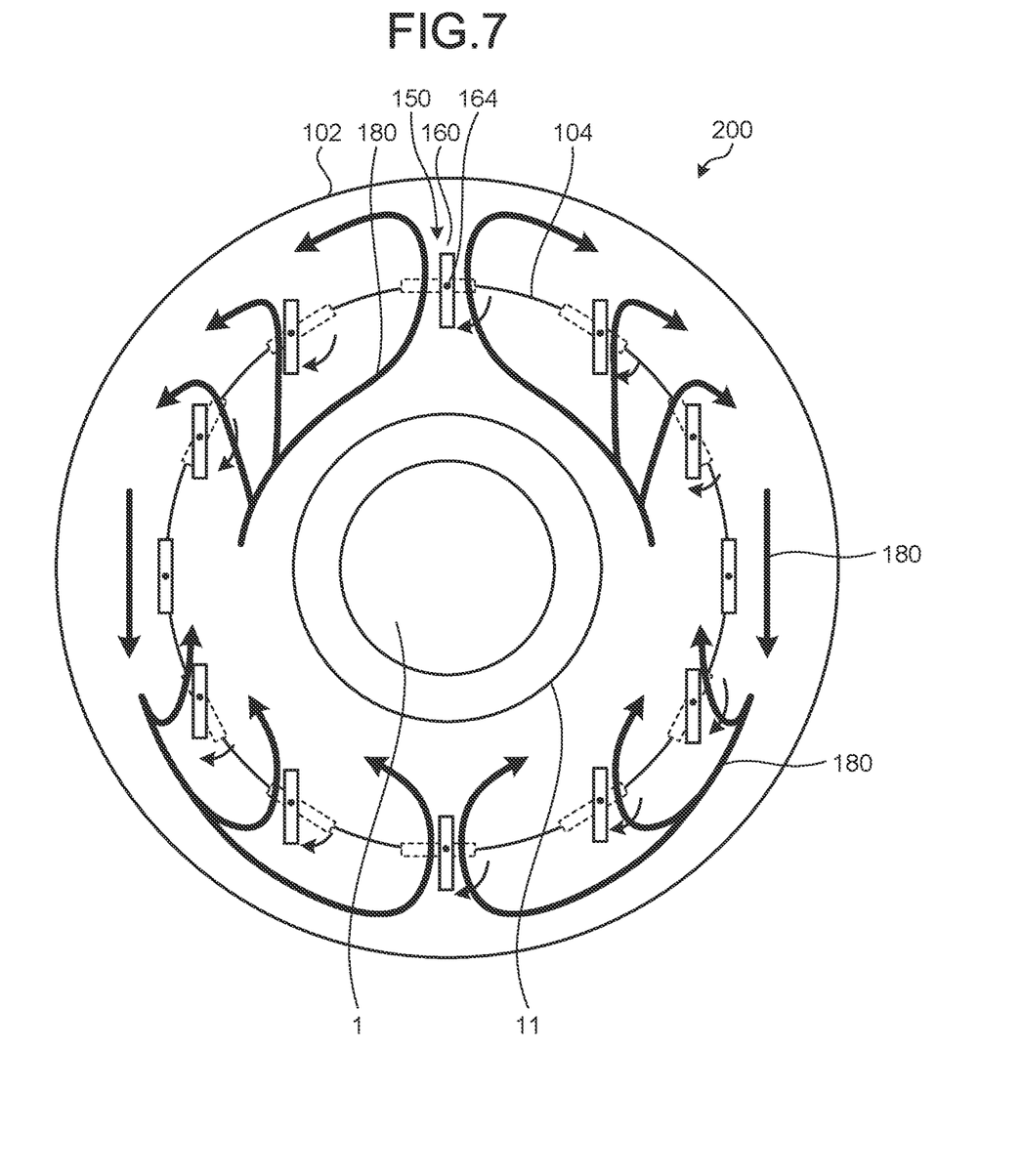
FIG. 7 is a sectional schematic diagram for illustrating the function of the nuclear reactor unit according to the other embodiment.

FIG. 6 is a sectional schematic diagram of a nuclear reactor and a nuclear reactor vessel of a nuclear reactor unit of another embodiment. FIG. 7 is a sectional schematic diagram for illustrating the function of the nuclear reactor unit according to the other embodiment. The inner shroud 104 of this nuclear reactor vessel 200 of the nuclear power generation system illustrated in FIG. 6 has the main body 106, a plurality of communicating parts 150, and communicating parts 170.

The communicating parts 150 are placed at a plurality of locations in the circumferential direction of the main body 106. The communicating parts 150 are placed facing a plurality of holes 109 formed in the main body 106. The communicating parts 150 each include a plate part 160 and brazed parts 166 and 168. The plate part 160 includes a plate main body 162 and a pivot shaft 164. The plate main body 162 is a plate-shaped member filling the hole 109 formed at the position in which the main body 106 is placed. The plate main body 162 is formed of a material not becoming deformed even if the temperature of the reactor core 1 becomes an abnormal temperature, or metal, for example. The pivot shaft 164 is fixed to the main body 106 and supports the plate main body 162 in a pivotable manner. The plate part 160 is a mechanism enabling the plate main body 162 to pivot about the pivot shaft 164 with respect to the main body 106. The pivot shaft 164 is placed at a position off the center of the plate main body 162 on the surface of the plate main body 162 in a direction orthogonal to the pivot shaft 164. In other words, in the radial direction of the pivot shaft 164, a distance L1 from the pivot shaft 164 to one end of the plate main body 162 of the plate main body 162 and a distance L2 from the pivot shaft 164 to the other end of the plate main body 162 of the plate main body 162 are different distances, or L1>L2 in this embodiment.

The brazed parts 166 and 168 are coupling parts coupling the plate part 160 and the main body 106 to each other. The brazed parts 166 and 168 fill all gaps between the plate part 160 and the main body 106 and isolate the first space 110 from the second space 112. The brazed parts 166 and 168 are formed of a material that can maintain the coupling between the plate part 160 and the main body 106 in the case of the normal temperatures during the operation of the reactor core 1 and causes the plate part 160 and the main body 106 to be detached from each other when the threshold temperature is reached. The brazed parts 166 and 168 are formed of metal melting when the reactor core 1 reaches the threshold temperature and the temperature of the second space 112 becomes higher than the certain temperature, for example. The brazed parts 166 and 168 are formed of metal with a melting point of 850° C. or higher, for example. The brazed parts 166 and 168 are formed of a material with a melting point of A° C. or higher when the temperature during the rated operation of the reactor core 11 is A° C.

The communicating parts 170 are placed between the communicating parts 150. The non-communicating parts 170 of the present embodiment are placed at two opposite locations in the circumferential direction. The non-communicating parts 170 of the present embodiment are placed at two respective locations overlapping a line passing through the center of the main body 106 and parallel to the horizontal direction. The non-communicating parts 170 basically have the same configuration as that of the communicating parts 150 and each includes a plate main body 172, a shaft 174, and brazed parts 176 and 178. The plate main body 172 is a plate-shaped member filling the hole 109 formed in the position in which the main body 106 is placed. A plate part 171 has the same configuration as that of the plate part 160. The shaft 174 has the same configuration as that of the shaft 164. The brazed parts 176 and 178 have the same configuration as that of the brazed parts 166 and 168. In other words, the communicating parts 170 have the same configuration as that of the communicating parts 150 with only their placement positions different. The present embodiment may have a structure without providing the communicating parts 170 and the holes 109 at the positions in which the communicating parts 170 are provided.

In the nuclear power generation system illustrated in FIG. 6 and FIG. 7, when the temperature of the reactor core 1 becomes higher than the threshold temperature, the temperature of the second space 112 increases by the heat of the reactor core 1. In the nuclear reactor vessel 51, when the temperature of the second space 112 becomes higher than the certain temperature, as illustrated in FIG. 7, the welded parts 166 and 168 of the communicating parts 150 cannot maintain the coupling between the plate part 160 and the main body 106, and the plate main body 162 pivots about the pivot shaft 164. In the communicating parts 150 of the present embodiment, the distance L1 and the distance L2 are different from each other, making the force acting on the plate main body 162 different with the pivot shaft 164 as a pivot. With this effect, the communicating parts 150 pivot in a certain direction. Specifically, the communicating parts 150 pivot in a direction making the distance L1 side, in which the plate is longer, lower than the pivot shaft 164 in the vertical direction. With this pivoting, fluid (gas) flows into the first space 110 from the second space 112 as indicated in flows 180, and the first space 110 becomes a state in which a certain amount or more of gas is present from the vacuum condition. The communicating parts 170 are placed with the plate main body 172 directed parallel to the vertical direction, and thus do not change in position even when the brazed parts 176 and 178 no longer couple the main body 106 and the plate main body 172 to each other. When holes are formed in the brazed parts 176 and 178, gas passes through the formed holes. In the nuclear power generation system of the present embodiment, the communicating parts 150 placed in the circumferential direction are opened, and as indicated in the flows 180, the communicating parts 150 through which the gas flows from the first space to the second space and the communicating parts 150 through which the gas flows from the second space to the first space are produced, making the gas circulate between the first space and the second space. Although FIG. 7 illustrates a state in which the communicating parts 150 through which the gas flows from the first space to the second space and the communicating parts 150 through which the gas flows from the second space to the first space are switched with the communicating parts 170 as boundaries, this is not limiting. In addition, the gas flow changes with temperature distribution or the like.

With this effect, the heat of the reactor core 1 is conducted to the inner shroud 104 by the flows 180 of the second space 112. The heat of the inner shroud 104 is conducted to the outer shroud 102 by the flows 180 of the first space 110. By the circulation of the flows 180, the heat of the reactor core is conducted to the outer shroud 102. The outer shroud 102 discharges the heat to the outside of the nuclear reactor vessel 51. Thus, by the communicating parts with a structure in which the plate part rotates also, the vacuum of the first space can be broken when the temperature of the reactor core 1 becomes higher than the threshold temperature. By providing a plurality of communicating parts in the circumferential direction, flows through which the gas circulates between the first space and the second space are formed, and more heat can be conducted to the outer shroud.

In addition, by shifting the pivot shaft from the center of the plate main body, that is, by the pivot shaft not passing through the center of gravity of the plate part as in present embodiment, the plate part can be rotated in a certain direction when holding by the welded parts 166 and 168 is no longer maintained. With this effect, the gas flow can be suitably controlled.

Although the above embodiment describes a case in which the communicating part includes the filling part and the pivoting part, this is not limiting. The communicating part is only required to be able to break the vacuum of the first space by communicating the first space to the second space isolated from the first space, when the reactor core 11 reaches the threshold temperature or higher. The communicating part may be a mechanism producing deformation such as buckling to form a hole in the main body of the inner shroud when the reactor core 11 reaches the threshold temperature or higher, for example.

In addition, as in the present embodiment, applying to the nuclear reactor unit that conducts the heat of the reactor core 11 to the outside of the nuclear reactor vessel by solid heat conduction as the heat conductive part enables applying to a relatively small, what is called a micro nuclear reactor, thereby improving performance during the normal operation and improve abnormal heat radiation performance without using complicated mechanisms. The nuclear reactor is not limited to a system using solid heat conduction, but can be applied to a mechanism in which a nuclear reactor vessel has a double structure and the space between shrouds outside a reactor core is made a vacuum condition.

The components described above include ones that can be readily thought of by those skilled in the art and substantially the same ones. Furthermore, the configurations described above can be combined with each other as appropriate. Various omissions, replacements, or modifications of the configurations can be made without departing from the gist of the present invention.

REFERENCE SIGNS LIST

1 Reactor core
2 Shielding part
3 Heat conductive part
4 Control part
6 Heat insulating part
11 Nuclear reactor
50 Nuclear power generation system (nuclear reactor
51 Nuclear reactor vessel
52 Heat exchanger
53 Heat conductive part
54 Coolant circulating unit
55 Turbine
56 Power generator
57 Cooler
58 Compressor
102 Outer shroud
104 Inner shroud
106 Main body
108, 108a Communicating part (filling part)
109 Hole
110 First space
112 Second space
130, 132, 134, 180 Flow
150, 170 Communicating part
160 Plate part
162, 172 Plate main body
164, 174 Pivot shaft
166, 168, 176, 178 Brazed part

The invention claimed is:
1. A nuclear reactor unit comprising:
a reactor core that has radioactive fuel and causes the radioactive fuel to cause a nuclear reaction;
a nuclear reactor vessel that houses the reactor core and hermetically seals the reactor core; and
a heat conductive part inserted into the reactor core, exposed to an exterior of the reactor vessel, and transmitting heat from the reactor core to the exterior of the reactor vessel by solid heat conduction, wherein
the nuclear reactor vessel includes an inner shroud that covers the entire periphery of the reactor core and an outer shroud that covers the entire periphery of the inner shroud,
a first space formed by the outer shroud and the inner shroud is in a vacuum condition,
a second space which is an inner space of the inner shroud is filled with an inert gas, and
the inner shroud includes a main body and a communicating part that is placed in part of the main body, the communicating part communicating the first space to the second space when the reactor core reaches a threshold temperature or higher.
2. The nuclear reactor unit according to claim 1, wherein the communicating part includes a filling part that is formed of a material with a melting point lower than the main body and fills a hole that is formed in the main body, and the communicating part opens the hole of the main body when the threshold temperature or higher is reached and a temperature of the second space increases.
3. The nuclear reactor unit according to claim 2, wherein the filling part is a metal that melts when the threshold temperature or higher is reached and the temperature of the second space increases.
4. The nuclear reactor unit according to claim 2, wherein the filling part is broken by differential pressure between the first space and the second space when the threshold temperature or higher is reached to open the hole of the main body.

5. The nuclear reactor unit according to claim 1, wherein the communicating part includes: a plate part that is placed in a hole of the main body and is pivotable with respect to the main body; and a coupling part that is formed of a material with a melting point lower than the main body and couples the plate part to the main body, and when the reactor core reaches the threshold temperature or higher and a temperature of the second space increases, the coupling part is detached from at least one of the main body and the plate part.

6. The nuclear reactor unit according to claim 5, wherein the coupling part is a metal that melts when the threshold temperature or higher is reached and the temperature of the second space increases.

7. The nuclear reactor unit according to claim 5, wherein a pivot shaft of the plate part does not pass through the center of gravity of the plate part.

8. The nuclear reactor unit according to claim 1, further comprising a heat conductive part that conducts heat generated in the reactor core to outside of the nuclear reactor vessel by solid heat conduction.

9. A method for cooling a nuclear reactor unit that includes a reactor core that has radioactive fuel and causes the radioactive fuel to cause a nuclear reaction, a nuclear reactor vessel that houses the reactor core and hermetically seals the reactor core and a heat conductive part inserted into the reactor core, exposed to an exterior of the reactor vessel, and transmitting heat from the reactor core to the exterior of the reactor vessel by solid heat conduction, wherein the nuclear reactor vessel includes an inner shroud that covers the entire periphery of the reactor core and an outer shroud that covers the entire periphery of the inner shroud, a first space formed by the outer shroud and the inner shroud is in a vacuum condition, a second space which is an inner space of the inner shroud is filled with an inert gas, and the inner shroud includes a main body and a communicating part that is placed in part of the main body, the method comprising causing the communicating part to break the vacuum condition of the first space by communicating the first space to the second space when the reactor core reaches a threshold temperature or higher.

* * * * *